No. 756,378. PATENTED APR. 5, 1904.
J. J. KOCH & J. HÜMBELI.
COOK STOVE.
APPLICATION FILED JULY 2, 1903.
NO MODEL.
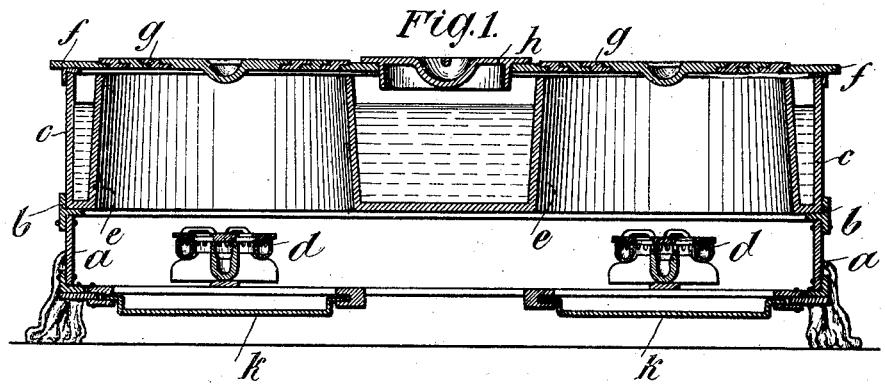
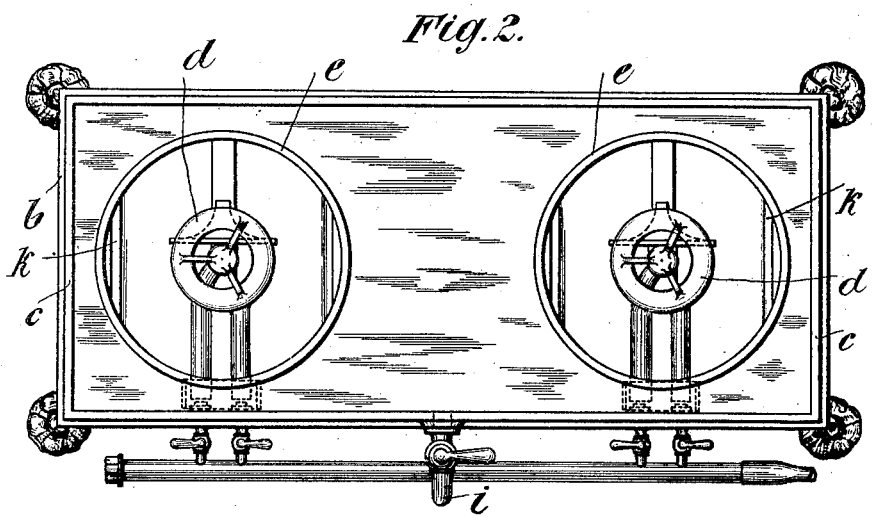
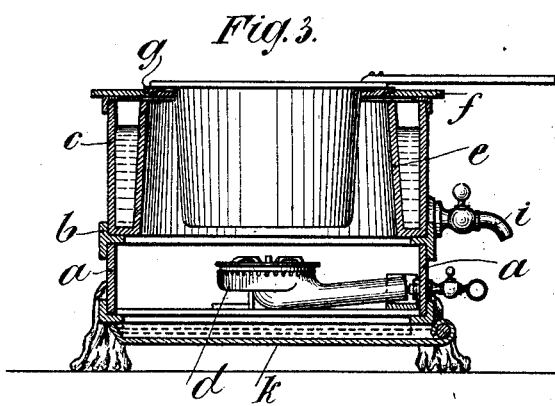
Witnesses: Inventors.
Johann Jakob Koch,
Joseph Hümbeli
by
Atty.

No. 756,378. Patented April 5, 1904.

UNITED STATES PATENT OFFICE.

JOHANN JAKOB KOCH AND JOSEPH HÜMBELI, OF WOHLEN, SWITZERLAND; SAID HÜMBELI ASSIGNOR TO SAID KOCH.

COOK-STOVE.

SPECIFICATION forming part of Letters Patent No. 756,378, dated April 5, 1904.

Application filed July 2, 1903. Serial No. 164,042. (No model.)

*To all whom it may concern:*

Be it known that we, JOHANN JAKOB KOCH and JOSEPH HÜMBELI, citizens of the Republic of Switzerland, residing at Wohlen, Aargau, Switzerland, have invented new and useful Improvements in Cook-Stoves, of which the following is a specification.

The present invention has reference to improvements in cook-stoves, and relates more especially to cook-stoves with burners for consuming gaseous or liquid fuel, as coal-gas, coal-oil, or the like; and the object of the invention is to provide a stove in which all of the generated heat is made use of to the best advantage.

With this object in view the invention consists of the construction and arrangement of parts as will hereinafter be described with reference to the accompanying drawings and specifically pointed out in the appended claims.

In the drawings is shown by way of example a construction of stove with gas-burners, and it represents, in—

Figure 1, a sectional longitudinal elevation;
Fig. 2, a plan view with top plate removed, and Fig. 3 a cross-sectional elevation.

The stove essentially consists of an oblong rectangular frame $a$, resting upon suitably-ornamented feet. The upper edge of this frame $a$ is formed by a T or flanged rail $b$, as shown in Figs. 1 and 3. Upon the horizontally-extending rib of this T-rail rests the water-receptacle $c$. A trifle below the bottom line of this receptacle are arranged the burners $d$, secured in a suitable manner in the frame $a$.

Above the burners and concentrically therewith are provided tubular chambers $e$ in the water-receptacle $c$, adapted to receive the cooking vessels. The water-receptacle $c$ is closed at the top by a removable cover-plate $f$, and concentric partly-overlapping rings $g$ serve to more or less cover the receptacle $c$ and chambers $e$, according to the diameter of the cooking vessel used.

A very desirable and important feature of our invention is in providing a large water-space between the tubular chambers $e$, where a supply of hot water may be kept constantly on hand and also where a vessel may be placed for the purpose of keeping the contents thereof warm until ready for use without further cooking or "drying up" of the food. This we attain by providing in the top $f$ of the water-receptacle an opening communicating with said water-space between the tubular chambers, which opening is capable of receiving a cooking vessel above mentioned. When not containing a vessel for the purpose above stated, the opening may be closed by a plate $h$, as shown in Fig. 1. The diameter of this opening may also be changed at will by using the concentric rings $g$, above described. The hot water may be conveniently drawn off at will by means of a faucet $i$, preferably situated in the side of the receptacle near the bottom between the tubular chambers, as shown in Figs. 2 and 3.

Below the burners are slidingly arranged in the frame $a$ drip-pans $k$.

In the described stove the generated heating-gases collect in the chambers $e$ around the cooking vessel and not only heat the latter but also the water-receptacle walls. The pans $k$ serve to receive overflow from the cooking vessel or water-receptacle and other impurities and can easily be removed for emptying purposes. The water-receptacle is preferably made of cast-iron to prevent destruction in case the stove is put in operation without the water-receptacle having been previously filled.

Having now particularly described and ascertained the nature of our said invention and in what manner the same is to be performed, we declare that what we claim is—

1. A cooking-stove, comprising a water-chamber provided with an open-ended passage for the reception of cooking utensils and with an opening in its top for the reception of like utensils to be heated by the water-bath or steam, and a support for said chamber; in combination with covers for said passage and opening and a fluid-fuel burner below the passage, for the purpose set forth.

2. A cooking-stove comprising a base open at top and bottom, a water-chamber supported by said base so as to form a continuation thereof and provided with an open-ended passage for the reception of cooking utensils and with an opening in its top for the reception of like utensils to be heated by the water-bath or steam; in combination with covers for said passage and opening and a fluid-fuel burner below the passage, for the purpose set forth.

3. A cooking-stove comprising a water-chamber provided with open-ended passages for the reception of cooking utensils and with an opening in its top between said passages for the reception of a vessel to be heated by the water-bath or steam and a support for said chamber; in combination with covers for said opening and passages and a fluid-fuel burner below each passage, for the purpose set forth.

4. A cooking-stove comprising a base open at top and bottom, a water-chamber supported by said base and provided with open-ended upwardly-tapering passages for the reception of cooking utensils, with an opening in its top between said passages for the reception of a vessel to be heated by the water-bath or steam and with a draw-off cock near its bottom; in combination with covers for said opening and passages and a fluid-fuel burner below each of said passages, for the purpose set forth.

5. A cooking-stove comprising a base open at top and bottom, a water-chamber removably seated on said base and provided with open-ended passages for the reception of cooking utensils and with an opening in its top between said passages for the reception of a vessel to be heated by the water-bath or steam; in combination with covers for said opening and passages and a fluid-fuel burner below each passage, for the purpose set forth.

6. A cooking-stove comprising a base open at top and bottom, a water-chamber supported by said base and provided with open-ended passages for the reception of cooking utensils and with an opening in its top between said passages for the reception of a vessel to be heated by the water-bath or steam; in combination with covers for said opening and passages, a fluid-fuel burner below each passage, and a removable drip-pan below each burner of substantially the same diameter as the wider end of said passages.

7. A cooking-stove comprising a base open at top and bottom, a seat encompassing the upper edge of said base, a flange encompassing said seat a water-chamber seating on said seat and fitting into the flange thereof, said water-chamber provided with open-ended passages for the reception of cooking utensils and with an opening in its top for the reception of like utensils to be heated by the water-bath or steam; in combination with covers for said passage and opening and a fluid-fuel burner below the passage, for the purpose set forth.

8. In cook-stoves, the combination of a frame, a flanged upper edge on said frame, burners secured in said frame and drip-pans below said burners, a water-receptacle with tubular chambers adapted to be removably fitted to said frame edge, a cover-plate on said water-receptacle, a smaller cover-plate in said cover-plate, a faucet in said water-receptacle, and a plurality of concentric, partly-overlapping rings to cover the said tubular chambers, all substantially as and for the purpose set forth.

In testimony whereof we have signed our names to this specification in the presence of two subscribing witnesses.

JOHANN JAKOB KOCH.
JOSEPH HÜMBELI.

Witnesses:
MORITZ VEITH,
A. LIEBERKNECHT.